United States Patent Office 3,325,103
Patented June 13, 1967

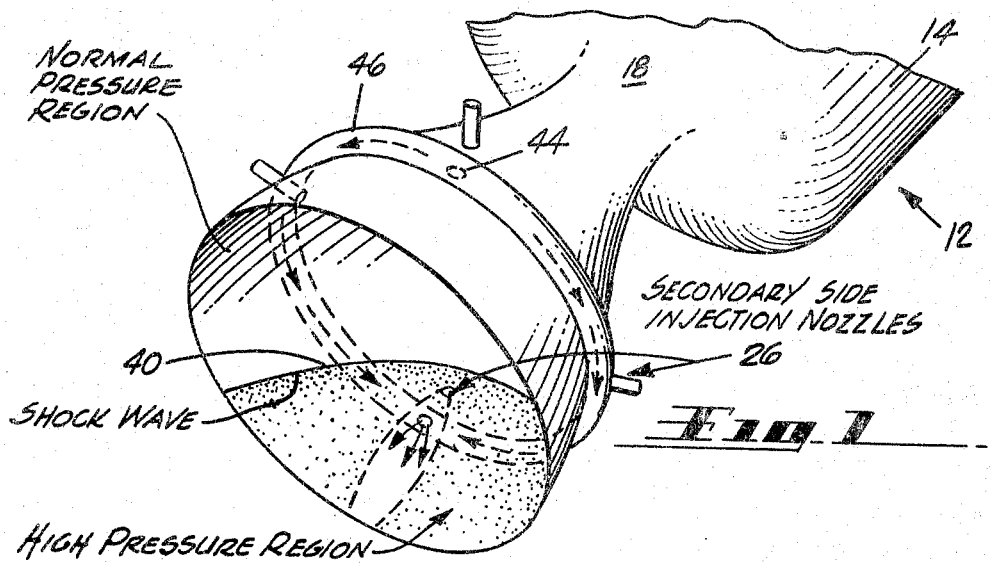
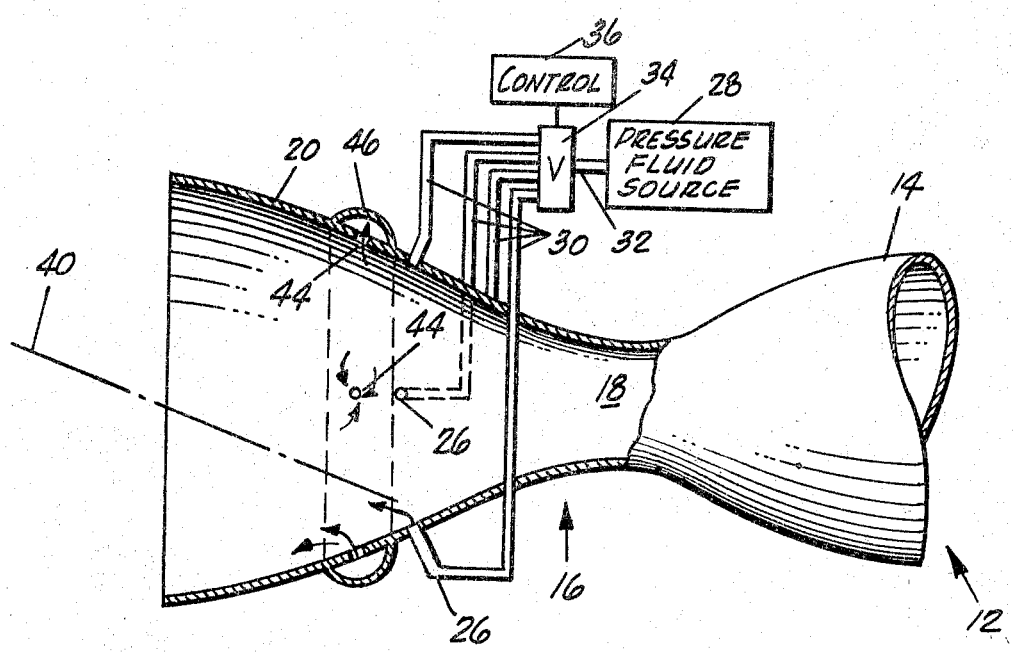
INVENTOR.
ANTON D. ABBOTT

3,325,103
THRUST VECTOR CONTROL FOR REACTION ENGINES
Anton D. Abbott, Manhattan Beach, Calif., assignor to The Aerospace Corporation, Los Angeles, Calif., a corporation of California
Filed Aug. 5, 1964, Ser. No. 387,640
3 Claims. (Cl. 239—265.17)

This invention relates to rocket thrust vector control. More particularly, it relates to apparatus for varying the effective direction of the thrust vector of exhaust gases exiting through the nozzle of a rocket engine.

Conventionally, directional control of rocket vehicles is attained through the use of moveable control or aerodynamic surfaces for flight within the atmosphere. In space flight, resort must be made to thrust producing devices acting at an angle to, or along a line removed from, the flight axis of the vehicle. Mechanically this has been accomplished by the employment of auxiliary thrust vector control rockets or by gimballing or swiveling the main thrust nozzle.

One of the more recent innovations in systems for attaining directional control of rocket propelled vehicles involves the actual or effective deflection of the gases exhausting through the main nozzle. Actual deflection can be attained by extending or protruding a short peg-like member into the exhaust stream from the nozzle wall. An effective deflection can be achieved by creating a shock wave across the exhaust as it exits through the expansion or divergent section of the nozzle. Such a shock wave can be set up in the nozzle by the injection of a high-speed, pencil-size flow of fluid, either liquid or gas, through the nozzle wall at an angle usually near normal, to the direction of the exhaust.

The side injection of a fluid stream (secondary injection) establishes a side force comprised of two distinct components. The first and lesser important, in a sense of magnitude, of these components is simply a function of the mass and velocity of the injected fluid and its angle of injection. The second and more significant force is the effect of the shock wave created by the impingement on the secondary injection fluid by the supersonic flow of the main exhaust stream. This shock wave trails off downstream in a sectional conical form from a point immediately forward of the injection port. Acting on the wall area of the nozzle downstream of the injection port, and bounded by the curved line of intersection of the shock wave with the wall, there is a total pressure higher than that on a corresponding diametrically opposed area of the wall of the nozzle expansion cone. This imbalance of pressure results in the side force used to control the direction of flight of the vehicle.

Within the higher overall or average pressure area bounded by the shock wave, there is contained a low pressure region immediately downstream of the injection port. The pressure in this region is actually less than that which would exist under normal conditions of no secondary injection flow, and, by the same token, less than that which exists on the nozzle wall in the corresponding area diametrically opposite the low pressure region. The presence of this low pressure region lowers the total or integrated pressure which acts to produce the side force. It follows then, that the raising of the pressure in this region would effect a higher average pressure and a greater magnitude in the side force thereby produced. If the side force can be increased without a proportional increase in the total flow rate of the secondary injection fluid required, then an advantage has been gained. The advantage is that a lesser quantity of secondary injection fluid is required to produce any given side force. The ultimate advantage thus attained being a higher performance vehicle less burdened by the weight of the secondary injection fluid it carries.

Because of its simplicity and ability to achieve full or omni-directional control, the usual vector control by secondary injection system adopted uses injection nozzles or ports spaced circumferentially around the rocket nozzle at 90 degree intervals. One or more injection nozzles or ports is located at each 90 degree interval. As will be seen, this arrangement enhances the facility with, or convenience by, which the present invention is incorporated in the thrust vectoring system.

The prime purpose of the invention herein is the reduction or elimination of the low pressure region lying within the confines of the higher average pressure area, within the exhaust cone of a rocket nozzle, and which is established by secondary injection for the purpose of thrust vector control. This purpose is achieved by placing the low pressure region in communication with a gas source of higher pressure. More specifically, the present invention employs breather openings through the nozzle wall at a point located a short distance directly downstream of the secondary injection ports. These breathers are in turn placed in communication with each other via a ducting system on the external side of the rocket nozzle.

As previously mentioned, the small, lower pressure region aft of an operating secondary injection port is at a pressure lower than that which exists circumferentially on the nozzle wall where there is no secondary flow. Thus when secondary injection flow is caused at one port the pressure at its associated breather is lower than that at the other breathers. By connecting all breathers via a common duct or manifold those other breathers will bleed off some exhaust gas which will flow to and be expelled from the breather in the injection area. This gas flow increases the pressure behind the operating injection port with a resultant increase in the side force produced.

Thus, by the use of a manifold connecting the breather openings, a flow of gas is established through the desired breather without the need of any valving system and without the requirement that a separate source of fluid be carried in the vehicle for expulsion from the breather outlet or that the secondary injection fluid be concurrently expelled from the breather outlet. It is to be recognized, however, that, if desired, the breather openings could be fed gas from a separate pressurized source or some of the gas used for secondary injection could be bled off and ducted to the breathers and valving could be used within the duct to control gas flow.

These and other objects and advantages of the invention will be better understood by the following description of the presently preferred embodiment of the invention taken in conjunction with the accompanying drawing in which:

FIG. 1 is a fragmentary sectional view of a rocket engine particularly showing the expansion cone of the rocket nozzle; and FIG. 2 is a side section view of the expansion cone of the nozzle with portions of the thrust vector control apparatus being shown schematically.

Referring now to FIG. 1, there is shown a rocket engine 12 having a combustion chamber 14 and a discharge nozzle 16. From the aft end of the chamber 14 extends the discharge nozzle 16 including a throat section 18 and a divergent expansion section 20. In the conventional manner, thrust is produced by the engine 12 by the burning of the propellant with the resultant gases passing at sonic speed through the throat 18 and expanding supersonically in divergent section 20.

Control of the vehicle propelled by engine 12 is attained by varying the direction of the thrust vector of the gases exhausting from the nozzle 16. In the present invention thrust vector control is effected by the use of a series of secondary fluid injection nozzles 26 spaced at 90 degree intervals around the periphery of the divergent main nozzle section 20, and located between the nozzle throat 18 and the aft end of the nozzle 16. Each of the secondary injection nozzles 26 is in flow communication with a source 28 of pressurized fluid by way of ducts 30 and 32. There is interposed between these ducts a distributing valve 34 whose operation is to selectively connect the source 28 with any one, or combination, of the side injection nozzles 26. Schematically shown at 36 is a conventional control to accomplish the desired selectivity.

The fluid supplied from source 28 is a volatile liquid or a gas which may also be combustible. When this fluid is injected into the rocket engine exhaust nozzle, a generally conical shock wave is set up across the exhaust with the apex of the wave appearing immediately forward or upstream of the side nozzle 26 through which the secondary flow is injected. In FIGS. 1 and 2 this shock wave 40 is shown as being created by secondary injection through lower nozzle 26.

As the exhaust gases pass through shock wave 40 they are decelerated with a resultant increase in their static pressure. This increased pressure in the region behind the shock wave, as shown in FIG. 1, establishes an imbalance of pressures acting against the side of the exhaust nozzle which is conveniently used for directional control.

Unfortunately there would normally occur immediately aft of the injection nozzle 26 a small trough or region, outlined by broken lines in FIG. 1 and bounded on one side by the wall of divergent nozzle section 20, wherein the pressure is not increased but is reduced. To alleviate this low pressure condition this invention employs a series of breather ports 44, which are located downstream of the secondary injection nozzles 26. By discharging a gas under pressure through these breather ports 44 which are located in a region of lower pressure, the pressure downstream of the breather port 44 which would otherwise be below normal is raised.

Each of the breather ports 44 is communicated with the others by a manifold 46 which extends circumferentially about the divergent section 20 of nozzle 16. The manifold 46 is appropriately bonded to or integrated structurally with the exhaust nozzle 16 so that, in addition to its ducting function, it can serve to structurally reinforce the nozzle.

While other pressure sources might be employed to supply fluid to the breather ports 44, the manifold 46 is particularly attractive by reason of its simplicity. As previously mentioned, injection of fluid through any one of the secondary nozzles 26 creates, within the area of total higher pressure downstream of and bounded by the shock wave, a smaller region of subnormal pressure. The pressure in this region is lower than that existing at the other breather ports 44 which are located outside and upstream of the shock wave. Therefore, as soon as secondary injection is commenced at any of the side nozzles 26, a portion of the main exhaust is bled off through the other breather ports 44, transferred via the manifold 46, and is discharged into the low pressure region adjacent the operating secondary injection nozzle 26. Thus, there results instantaneous flow through the breathers 44 without the requirement of valves, associated controls, or an independent supply of pressurized fluid.

The accompanying figures and above description show the presently preferred embodiment of my invention; application of my invention is not limited thereto but is capable of modification, change, and substitution within the scope of the following claims.

I claim:
1. In combination:
a rocket engine main nozzle having a throat and a divergent section for the expansion and discharge of thrust producing gases;
a series of side injection nozzles spaced peripherally about the main nozzle and located between the nozzle throat and aft end of the divergent section and being directed to discharge fluid laterally into the thrust producing gases to create therein thrust vector control shock waves;
a source of pressurized fluid communicating with the series of injection nozzles;
valve means selectively operable to control the flow of fluid between the source and selected ones of the series of side injection nozzles;
breather port means in the divergent section of the nozzle and being located substantially directly downstream of each of the series of side injection nozzles;
a manifold extending peripherally about the exterior of the divergent nozzle section, said manifold flow-communicating each of the breather port means with the others, whereby, when the pressure is reduced to a subnormal degree at any one of the breather port means as a result of the production of a shock wave by the flow of fluid through its associated side injection nozzle, a portion of the thrust producing gases will be bled off by the other of the breather port means and will flow through the manifold and out of the breather port at which exists a subnormal pressure.

2. In combination:
a rocket engine main nozzle having a divergent section for the discharge of thrust producing gases;
a series of side injection nozzles spaced peripherally about the main nozzle medially of its divergent section and being directed to discharge fluid laterally into the thrust producing gases to create therein thrust vector control shock waves;
a source of pressurized fluid communicating with the series of injection nozzles;
valve means selectively operable to control the flow of fluid between the source and selected ones of the series of side injection nozzles;
a breather port located substantially directly downstream of each of the series of side injection nozzles; and
common duct means permanently interconnecting the breather ports whereby gas flow is induced between breather ports having pressure differentials.

3. In combination with a discharge nozzle;
first outlet means in the nozzle for directing a flow of pressurized fluid laterally into gases flowing through the nozzle to produce a shock wave thereacross for effective directional control of discharge gases;
a pressurized fluid source communicating with the outlet means;
selectively operable means controlling the flow from the fluid source to the outlet means;
second outlet means in the nozzle positioned relative to the first outlet means in a direction downstream of the flow of gases through the nozzle; and
duct means permanently interconnecting the second outlet means for directing therebetween a flow of fluid.

References Cited

UNITED STATES PATENTS

| | | | |
|---|---|---|---|
| 2,799,990 | 7/1957 | Hausmann | 60—35.55 |
| 2,916,873 | 12/1959 | Walker | 60—35.54 |
| 3,016,063 | 1/1962 | Hausmann | 137—81.5 |
| 3,036,430 | 5/1962 | Eggers et al. | 60—35.54 |
| 3,091,924 | 6/1963 | Wilder | 60—35.54 |
| 3,116,603 | 1/1964 | Hausmann | 60—35.54 |
| 3,121,312 | 2/1964 | Hopper | 60—35.54 |
| 3,132,476 | 5/1964 | Conrad | 60—35.54 |
| 3,212,259 | 10/1965 | Kepler | 60—35.54 |

MARK NEWMAN, *Primary Examiner.*

AL LAWRENCE SMITH, *Examiner.*